United States Patent
Insley et al.

(10) Patent No.: US 6,524,488 B1
(45) Date of Patent: *Feb. 25, 2003

(54) METHOD OF FILTERING CERTAIN PARTICLES FROM A FLUID USING A DEPTH LOADING FILTRATION MEDIA

(75) Inventors: Thomas I. Insley, West Lakeland Township, MN (US); Raymond P. Johnston, Lake Elmo, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,506

(22) Filed: Jun. 18, 1998

(51) Int. Cl.$^7$ .............................. B01D 37/00; B03C 3/00
(52) U.S. Cl. ...................... 210/767; 210/483; 210/488; 210/489; 210/490; 55/521; 95/78; 96/67; 96/69
(58) Field of Search ................................. 210/488, 490, 210/492, 767, 483, 489, 498; 55/DIG. 39, 521; 428/172, 188, 166, 167; 96/100, 99, 87, 67, 69; 29/411; 95/78, 79

(56) References Cited

U.S. PATENT DOCUMENTS

| | | | | |
|---|---|---|---|---|
| 1,555,574 A | * | 9/1925 | Herrmann | 210/488 |
| 1,646,404 A | * | 10/1927 | Herbert | 210/488 |
| 3,037,633 A | * | 6/1962 | Veitel et al. | 210/232 |
| 3,234,639 A | * | 2/1966 | Rosenblum | 29/411 |
| 3,520,300 A | | 7/1970 | Flower, Jr. | |
| 3,550,257 A | | 12/1970 | Brown et al. | |

(List continued on next page.)

FOREIGN PATENT DOCUMENTS

| | | |
|---|---|---|
| DE | 32 12 295 A1 | 10/1983 |
| DE | 42 10 072 A1 | 3/1993 |
| DE | 4421859 | 1/1996 |

(List continued on next page.)

OTHER PUBLICATIONS

Article: "Fabrication of Novel Three–Dimensional Microstructures by the Anisotropic Etching of (100) and (110) Silicon", Ernest Bassous, *IEEE Transactions on Electron Devices*, vol. ED–25, No. 10, Oct. 1978.

Article: "Microtechnology Opens Doors to the Universe of Small Space", Peter Zuska *Medical Device & Diagnostic Industry*, Jan. 1997.

Article: "Simple and Low Cost Fabrication of Embedded Micro–Channels by Using a New Thick–Film Photoplastic" Guein, et al. 1997 Int'l Conference on Solid–State Sensors and Actuators, *Digest of Technical Papers*, vol. 2, Jun. 1997.

Article: "Fabrication of microstructures with high aspect ratios and great structural heights by synchrotron radition lithography, galvanoforming, and plastic moulding (LIGA process)" Becker, et al. *Microelectronic Engineering 4* (1986), pp. 35–56.

(List continued on next page.)

Primary Examiner—John Kim
(74) Attorney, Agent, or Firm—Gary L. Griswold; Robert W. Sprague; William J. Bond

(57) ABSTRACT

A filtration media is formed from at least one structured polymeric layer, wherein a structured surface is defined within the layer. Layers may be configured as a stack that has the structured surfaces defining a plurality of ordered inlets open through a face of the stack and corresponding ordered fluid pathways, thereby forming an ordered, porous volume. The ordered fluid pathways may be defined by a plurality of flow channels formed within the structured surfaces of the structured layers, or may be defined by a plurality of protuberances formed in an ordered pattern within the structured surfaces of the structured layers.

19 Claims, 6 Drawing Sheets

U.S. PATENT DOCUMENTS

| | | | |
|---|---|---|---|
| 3,594,863 A | | 7/1971 | Erb |
| 3,715,192 A | | 2/1973 | Wenz et al. |
| 3,783,588 A | | 1/1974 | Hudis |
| 3,812,972 A | * | 5/1974 | Rosenblum ................ 210/489 |
| 3,993,566 A | | 11/1976 | Goldberg et al. |
| 3,998,916 A | | 12/1976 | van Turnhout |
| 4,215,682 A | | 8/1980 | Kubik et al. |
| 4,233,029 A | | 11/1980 | Columbus |
| 4,234,324 A | | 11/1980 | Dodge, Jr. |
| 4,271,119 A | | 6/1981 | Columbus |
| 4,277,966 A | | 7/1981 | Rambauske |
| RE30,782 E | | 10/1981 | Van Turnhout |
| 4,313,741 A | | 2/1982 | Masuda et al. |
| RE31,285 E | | 6/1983 | Van Turnhout et al. |
| 4,392,362 A | | 7/1983 | Little |
| 4,413,407 A | | 11/1983 | Columbus |
| 4,533,352 A | | 8/1985 | Van Beek et al. |
| 4,579,555 A | | 4/1986 | Russo |
| 4,592,815 A | | 6/1986 | Nakao |
| 4,601,861 A | | 7/1986 | Pricone et al. |
| 4,639,748 A | | 1/1987 | Drake et al. |
| 4,668,558 A | | 5/1987 | Barber |
| 4,686,041 A | * | 8/1987 | Berg et al. ................... 210/335 |
| 4,726,900 A | * | 2/1988 | Keskinen et al. ............ 210/488 |
| 4,751,000 A | * | 6/1988 | Drori .......................... 210/448 |
| 4,758,481 A | | 7/1988 | Fauvel |
| 4,775,310 A | | 10/1988 | Fischer |
| 4,798,850 A | | 1/1989 | Brown |
| 4,867,876 A | * | 9/1989 | Kopf .......................... 210/228 |
| 4,906,439 A | | 3/1990 | Grenner |
| 4,913,858 A | | 4/1990 | Miekka et al. |
| 4,950,549 A | | 8/1990 | Rolando et al. |
| 4,978,450 A | * | 12/1990 | Drori .......................... 210/488 |
| 5,025,052 A | | 6/1991 | Crater et al. |
| 5,037,548 A | * | 8/1991 | Rosenberg ................... 210/488 |
| 5,055,118 A | * | 10/1991 | Nagoshi et al. ................ 96/88 |
| 5,057,710 A | | 10/1991 | Nishiura et al. |
| 5,069,403 A | | 12/1991 | Marentic et al. |
| 5,069,404 A | | 12/1991 | Bouchard |
| 5,077,870 A | | 1/1992 | Melbye et al. |
| 5,078,925 A | | 1/1992 | Rolando et al. |
| 5,099,026 A | | 3/1992 | Crater et al. |
| 5,112,503 A | * | 5/1992 | Raifman ..................... 210/232 |
| 5,133,516 A | | 7/1992 | Marentic et al. |
| 5,152,060 A | | 10/1992 | Schubert et al. |
| 5,158,030 A | | 10/1992 | DuBois et al. |
| 5,158,557 A | | 10/1992 | Noreen et al. |
| 5,175,030 A | | 12/1992 | Lu et al. |
| 5,176,667 A | | 1/1993 | DeBring |
| 5,200,248 A | | 4/1993 | Thompson et al. |
| 5,249,359 A | | 10/1993 | Schubert et al. |
| 5,256,231 A | | 10/1993 | Gorman et al. |
| 5,368,910 A | | 11/1994 | Langdon |
| 5,376,252 A | | 12/1994 | Ekström et al. |
| 5,405,434 A | | 4/1995 | Inculet |
| 5,411,858 A | | 5/1995 | McGeehan et al. |
| 5,437,651 A | | 8/1995 | Todd et al. |
| 5,440,332 A | | 8/1995 | Good |
| 5,450,235 A | | 9/1995 | Smith et al. |
| 5,455,100 A | * | 10/1995 | White |
| 5,472,481 A | | 12/1995 | Jones et al. |
| 5,477,891 A | | 12/1995 | Benesi |
| 5,496,507 A | | 3/1996 | Angadjivand et al. |
| 5,514,120 A | | 5/1996 | Johnston et al. |
| 5,527,588 A | | 6/1996 | Camarda et al. |
| 5,614,093 A | * | 3/1997 | Mueggenburg et al. ..... 210/355 |
| 5,651,888 A | | 7/1997 | Shimizu et al. |
| 5,651,900 A | | 7/1997 | Keller et al. |
| 5,656,368 A | | 8/1997 | Braun et al. |
| 5,691,846 A | | 11/1997 | Benson, Jr. et al. |
| 5,698,299 A | * | 12/1997 | Schmidt et al. ............. 428/209 |
| 5,728,446 A | | 3/1998 | Johnston et al. |
| 5,797,978 A | * | 8/1998 | Rosenberg et al. ............ 95/74 |
| 5,798,042 A | * | 8/1998 | Chu et al. ................... 210/490 |
| 5,932,315 A | | 8/1999 | Lum et al. |

FOREIGN PATENT DOCUMENTS

| | | |
|---|---|---|
| DE | 195 01 017 A1 | 7/1996 |
| EP | 0 039 291 A1 | 11/1981 |
| EP | 0 582 286 A1 | 2/1994 |
| EP | 591117 | 4/1994 |
| GB | 1 338 579 | 11/1973 |
| GB | 1 354 502 | 5/1974 |
| GB | 2 308 320 A | 6/1997 |
| JP | 56-10312 | 2/1981 |
| JP | 56-10313 | 2/1981 |
| JP | 56-10314 | 2/1981 |
| JP | 58-175560 | 10/1983 |
| JP | 59-228919 | 12/1984 |
| JP | 3-238011 | 10/1991 |
| JP | 4-4011 | 1/1992 |
| JP | 4-176310 | 6/1992 |
| JP | 02174909 | 7/1994 |
| JP | 7-144108 | 6/1995 |
| JP | 7-213945 | 8/1995 |
| JP | 7-241491 | 9/1995 |
| JP | 8-713450 | 3/1996 |
| JP | 10-174823 | 6/1998 |
| JP | 11090133 | 4/1999 |
| WO | 89/04628 | 6/1989 |
| WO | 93/11727 | 6/1993 |
| WO | WO 9422557 | 10/1994 |
| WO | 96/09879 | 4/1996 |
| WO | 97/13633 | 4/1997 |

OTHER PUBLICATIONS

Article: "UV Laser Machined Polymer Substrates for the Development of Microdiagnostic Systems" Roberts, et al. *Analytical Chemistry*, vol. 69, No. 11, Jun. 1997.

Article: "Processing of Three–Dimensional Microstructures Using Macroporous n–Type Silicon" Ottow et al. *J. Electrochem. Soc.*, vol. 143, No. 1, Jan. 1996.

* cited by examiner

METHOD OF FILTERING CERTAIN PARTICLES FROM A FLUID USING A DEPTH LOADING FILTRATION MEDIA

The present invention relates to a filtration media and device comprising at least a layer having a structured surface that defines highly ordered fluid pathways.

BACKGROUND

An important segment of filtration media and filtering device development for removing particles from a fluid stream has been in the nonwoven fiber technology area. From the use of webs derived from meltblown microfibers to that of microdenier staple fibers, the trend has been to decrease fiber size in order to increase available surface area per unit volume of web. These nonwovens are generally polymeric based, entanglement bonded, low density webs that incorporate micron or near micron size fibers.

The principle mechanisms that control particle removal from a fluid stream by a fibrous filter are direct interception, inertial impaction, diffusion, and electrostatic attraction. Particle collection by interception occurs when a particle following a gas streamline strikes and is captured by the filtering surface. Inertial impaction results when particles deviate from the fluid stream to strike the fibers. Impacted particles in both cases adhere to the fibers by forces such as Van der Waals' forces. Diffusional collection occurs when the Brownian motion of very small particles enhances the probability of their contact with the filtering surface. This motion causes the particles to deviate from fluid stream lines and collect on the individual filter fibers. Electrostatic collection is an important mechanism whereby charged particles are attracted to oppositely charged collection surfaces by coulombic attraction.

Fibrous fluid filters, especially gas filters, typically combine all four capture mechanisms. Nonwoven filters incorporate the advantages of these fibrous filters due to their inherent properties. However, limitations with nonwovens as filtration media also stem from their inherent properties. Nonwoven webs by definition are randomly formed structures that have limited geometric order. Limited order is caused by the variability between individual fibers and the degree of fiber to fiber conformation within the web. This limited order is manifested by gross irregularities caused by the formation of macrostructures known as shingles and fiber nests. Web macrostructures have local concentrations of fibers that cause pore size variability as well as mass variability across the webs. As a result, relatively large openings between the fibers allow particles through that should have been excluded, and small openings fill and become ineffective. In filter media design these limitations are moderated by the use of additional material at the cost of higher flow resistance across the filter. These effects can be compounded during use in filtration applications by the force of the applied fluid, which can alter the web structure and thus the efficacy of the filtration device. In addition, pressure loading of the web, wherein the web is mechanically formed into product, for example, a pleated structure, can also cause additional deformation of the fibers and web, resulting in a decrease in filtration efficacy.

Other limitations of high surface area nonwoven webs as filtration media occur when the filter employs thin flat layers of nonwoven web, such as in respirators, or the filter employs pleated layers in a more three-dimensional arrangement, such as in room, furnace or computer filters. Because of their respective usages, the fluid velocity across the face of the respirator type filters tends to be lower, whereas the fluid velocity across the face of circulating air filters, i.e. the room, furnace or computer filters, tends to be higher. In both situations, however, the nonwoven web material typically performs as a surface loading filter, thereby eventually resulting in surface blinding. In surface binding, the first encountered layers of filter material fill and clog with particulate matter removed from the fluid stream. Therefore, the filters are not effectively using the greater portion of the filter mass, and thus the filters' performance is limited based on filter surface area rather than filter volume.

The use of multiple layers to increase filter efficiency, especially in respirator type filters, can cause an increase in flow resistance across the media as the fluid passes through the filter layers. Flow resistance is a function of the gas face velocity and the relationship of the size, orientation, and number of torturous channels through the filter. Generally, a filter media with more uniformly distributed surface area will achieve greater overall filtration efficiency permitting the use of less material and, in turn, reduce flow resistance across the media.

Flow resistance across a filter media is a general design constraint for any filtration device. Flow resistance is particularly problematic in lower face velocity applications because the fluid velocity is low even before filtering, and any resistance to flow within the filter will have a dramatic effect on its output. This flow resistance can cause problems with the overall fluid handling system in which the filter is used.

Pleated structures of smaller fiber nonwoven webs are often used in the higher face velocity applications to reduce flow resistance and improve service life. This is because there is more filtering surface in a given volume, thereby increasing the percentage of surface openings per frame area of filter. When the nonwoven web is composed of microfibers, however, pleated structures can sometimes reduce web loft, (see U.S. Pat. No. 5,656,368 to Braun et al.) and may be limited by the size of the microfibers used because smaller fibers are more likely to cause surface blinding. Larger fibers may cause the filter to suffer from reduced overall filtering capacity due to a decrease in the actual fiber surface area.

Another means of improving filter efficiency is through treatment of the filter fibers to make them more attractive to the particles or the like to be removed from a fluid stream. Treatment methods include both passive and active electrostatic charging of the fibers, application of tacky material to the fibers, application of chemical additives such as catalysts or other reactive agents, as well as application of other types of additives, including deodorizers, drying agents, disinfectants, fragrances, and ozone removing agents. Although treatment methods can enhance particle capture by the fibers, the filters are still subject to the deficiencies associated with random media, such as surface blinding and the flow resistance limitations discussed above. Examples of treated filter media include commercial filter products known as electrets, such as those available from 3M Company under the trade designation "Filtrete".

Other types of filter media available for particle removal from a fluid stream include woven and knit materials. These types of materials tend to have a more ordered structure, thereby making them less susceptible to the limitations inherent in nonwovens. These materials, however, have their own problems with controlling structures fidelity due to variability in constituent fiber material, fiber formation and web construction. In addition, other problems include limitations such as small enough pore formation, constituent material costs, and manufacturing costs.

SUMMARY OF THE INVENTION

The present invention overcomes the disadvantages and shortcomings of the prior art by providing a filtration media or filtration device that is efficient, is capable of depth-bed loading, functions at a low flow resistance, and has a high collection capacity. More specifically, the present invention provides a filtration media comprising at least a layer having a structured surface that defines highly ordered fluid pathways. Preferably, the filtration media of the present invention comprises a stack of layers having structured surfaces defining a highly ordered array of filter openings and fluid pathways through the filtration media.

The structured surfaces of the layers may comprise features defining channels that form the fluid pathways, or may comprise features such as discrete protuberances that form the fluid pathways. The filter openings defined by the stacked structured layers remove particles by exclusion. Non-exclusion removal of particles is facilitated by the surface area of the structured surface features.

Filtration media in accordance with the present invention has the advantage of being efficient and having a high capacity because it uses the full volume by performing as a depth-bed filter, instead of as a surface filter. It is easily and economically manufactured from a variety of materials, including inexpensive, flexible or rigid polymers. The structured surface features of the filtration media are highly controllable, predictable and ordered, and are formable with high reliability and repeatability using known microreplication or other techniques. The filtration media can be produced in a high variety of configurations to meet the filtration requirements of a given application. This variety is manifested in: structured surface feature possibilities—discrete channels, open channels, or protuberances; channel configurations—wide, narrow, 'V' shaped, and/or sub-channels; stack configurations—bonded or unbonded, facing layers, non-facing layers, added layers, aligned channels, offset channels, and/or channel patterns; and filter openings—pore size, pore configuration, or pore pattern. In addition, the layers may be treated for enhanced filtration or other purposes.

The aforementioned advantages are achieved by a filtration media formed from at least one polymeric layer having a structured surface defined within it. Layers may be configured as a stack with the structured surfaces of the layers defining a plurality of ordered inlets open through a face of the stack and corresponding ordered fluid pathways, or may be a single layer with a structured surface having a cap layer, or may be an uncapped layer having a structured surface. In a stacked or capped arrangement, the layers thus form an ordered, porous volume. The ordered fluid pathways of the filtration media may be defined by a plurality of flow channels formed within the structured surfaces of the layers, or they may be defined by a plurality of discrete protuberances formed within the structured surfaces of the layers.

The plurality of flow channels are preferably defined by a series of peaks, each having two sidewalls. The peaks may be separated by a planar floor or by sub-peaks forming sub-channels within the flow channels. The peaks may have heads that overhang adjacent flow channels. The flow channels of a layer having a structured surface may be all the same or may be different. Each layer of the filtration media may have the same flow channel configuration, or may be different. The flow channels on adjacent layers may be aligned or may be offset.

Pairs of layers of the filtration media may face one another, and facing layers may engage one another. Layers may have structured surfaces defined on both faces. Additional layers may be added to the stack. A cap layer may cover a portion of the top of the layer, and additional layers may be placed between adjacent layers of the stack. The layers of the stack, or a layer and a cap layer, may be bonded together. The layers may be formed from the same or different polymeric materials. The filtration media may be treated to enhance particle removal or to provide other benefits such as providing oil and water repellency, removing odors, removing organic matter, removing ozone, disinfecting, drying, and introducing fragrance. Treatment may include charging of the layers to form an electret, surface coating of the layers, or addition of treated layers.

The aforementioned advantages may also be achieved by a method of filtering using the filtration media of the present invention. This method includes providing the filtration media, positioning the filtration media in a fluid flow path, passing a fluid through the filtration media, and removing particles from the fluid in the filtration media. This method may further comprise slicing a portion of a stack of layers having structured surfaces into a specific thickness to use as the filtration media, treating a portion of the layers to provide filtration benefits, and directing fluid flow to a specific destination by configuring the ordered fluid pathways within the filtration media.

In addition, these advantages may be achieved by a method of making and using the filtration media of the present invention. This method provides at least one layer having a structured surface defining highly ordered fluid pathways. The method may provide a plurality of layers having structured surfaces defining highly ordered fluid pathways by stacking the plurality of layers with the structured surfaces to define a plurality of ordered inlets open through a face of the stack and corresponding ordered fluid pathways and thereby forming an ordered, porous volume. The method also includes positioning the ordered, porous volume in a fluid flow path, passing fluid through the ordered, porous volume, and removing particles from the fluid in the ordered, porous volume. This method may also further comprise bonding of a portion of the layers, slicing a portion of the layers into a specific thickness, treating a portion of layers to provide filtration benefits, and directing fluid flow to a specific destination by configuring the ordered fluid pathways within the filtration media.

DETAILED DESCRIPTION OF PREFERRED EMBODIMENTS

Figure 2:
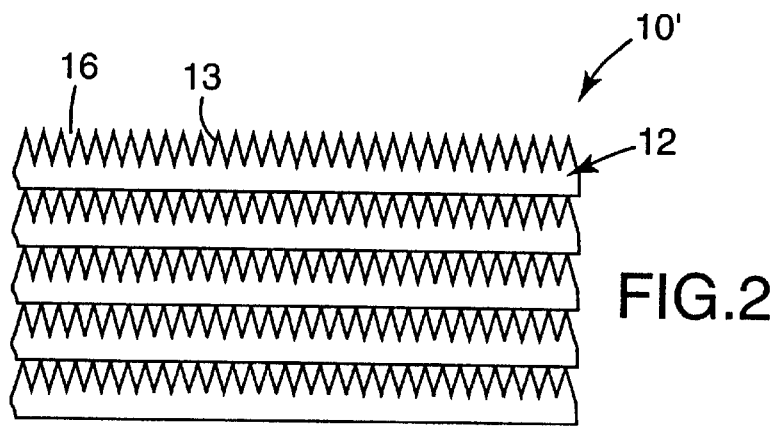
FIG. 2 is an end view of a stack of layers having structured surfaces forming the filtration media of FIG. 1.
Figure 3:
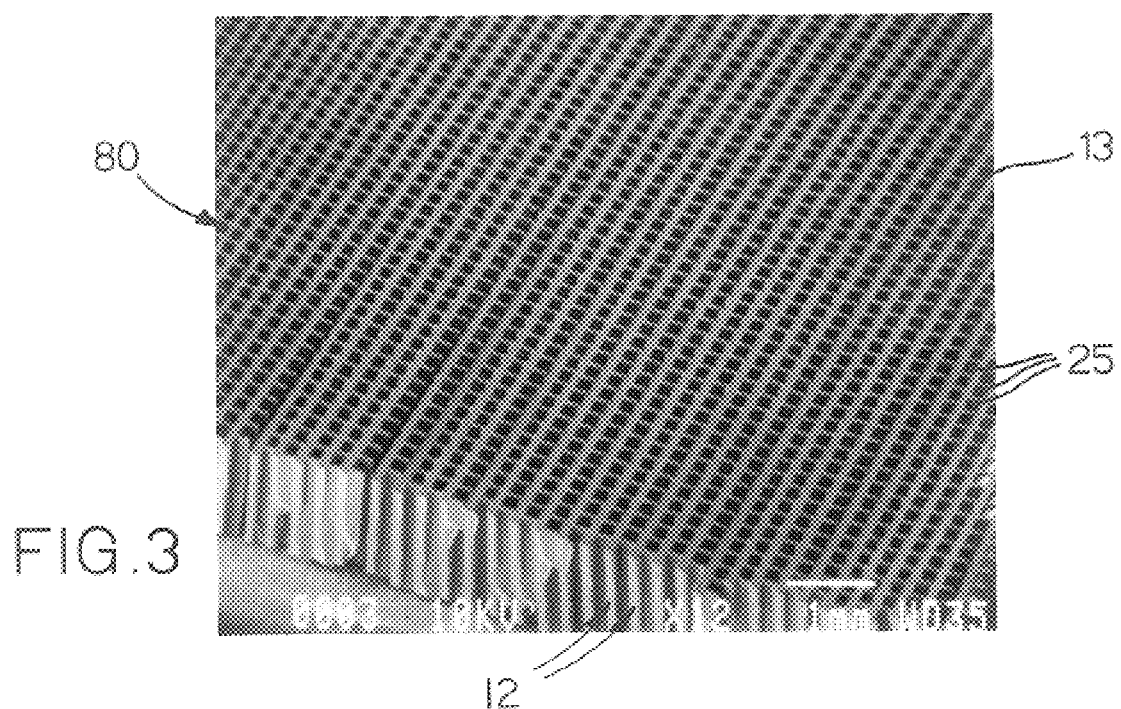
FIG. 3 is a perspective view of filtration media formed from layers having structured surfaces.
Figure 4:
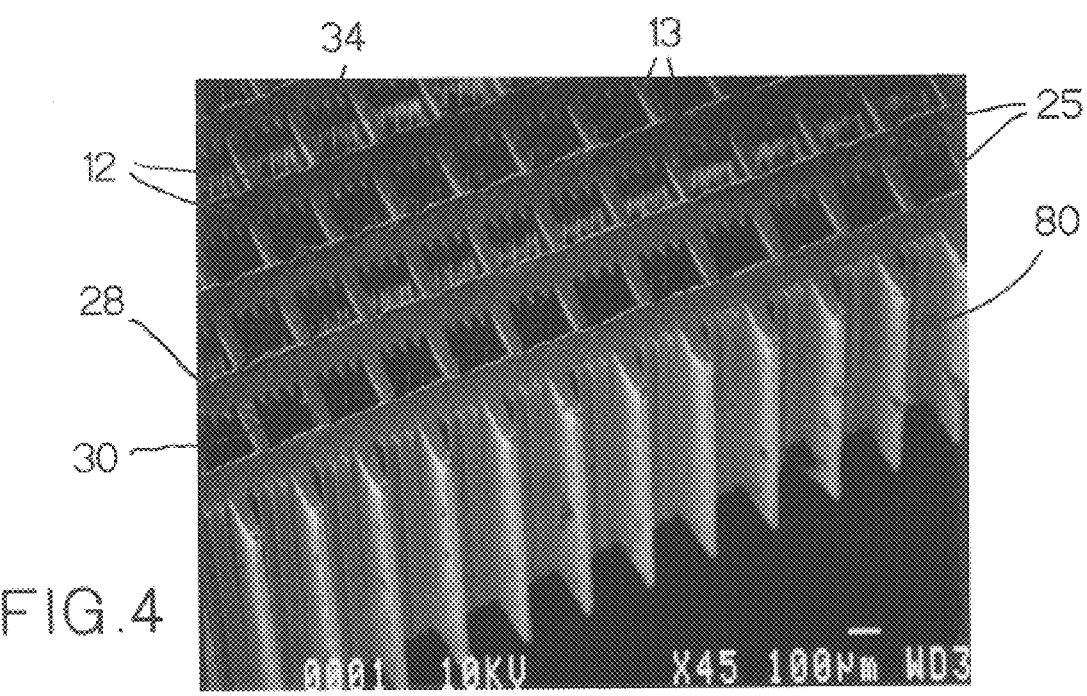
FIG. 4 is an enlargement of a portion of the filtration media shown in FIG. 3.

With reference to the attached Figures, like components are labeled with like numerals throughout the several Figures. FIGS. 1–4 illustrate filtration media 10 that includes stacked layers 12. Each layer 12 has a structured surface 13 on at least one of its two major surfaces, where a structured surface 13 comprises a surface with a topography (the surface features of an object, place or region thereof). In this embodiment, the structured surfaces 13 comprise a plurality of channels 25 formed within the layers 12 preferably as shown in a consistent, ordered manner. These channels 25 are defined by a series of peaks 28 formed of sidewalls 26 with or without a planar floor 30 in between them. Together the stacked layers 12 form a three dimensional, highly ordered, porous filtration media 10 wherein fluid, such as air, can flow through the media 10 via ordered fluid pathways, as defined by the channels 25, so that particulate or other matter can be removed from the fluid by exclusion and/or adherence to the structured surfaces. By ordered, it is meant that the pathways defined through the media are predetermined. As exemplified below, each pathway need not be the same as another of the same layer or a different layer. Each pathway is, however, predetermined in the sense that each pathway is set by a predetermined design of the structured surface 13 of each layer 12. A porous media is one that merely permits fluid flow through the media by way of more than a single flow path. FIGS. 3 and 4 are electron micrograph illustrations of an embodiment of a filtration media 10 in accordance with the present invention defining a highly ordered array of channels 25 made up from many layers 12.

The layers 12 may each comprise similar or different flexible, semi-rigid, or rigid material, which may be chosen depending on the particular application of the filtration media 10. Preferably, each of the layers 12 comprise a polymeric material because such material is typically less expensive and because such polymeric material can be accurately formed with a structured surface 13. The use of a polymeric layer 12 in the form of, for example, a film layer can provide a structured surface defining a large number of and high density of fluid flow channels 25 on a major surface thereof. Thus, a highly ordered porous filtration media of the invention is amenable to being manufactured with a high level of accuracy and economy.

As shown in FIGS. 1–4, this filtration media 10 is formed by stacking of the layers 12, one on top of another. In this manner, any number of layers 12 can be stacked together to form a filtration media 10 having adequate height and porous area designed specifically based upon the particular application. One advantage of direct stacking of layers 12 on each other is that the second major surface 11 of each layer 12 provides a cap on the channels 25 of the lower adjacent layer 12. Therefore, each channel 25 may become a discrete pathway for fluid flow through the filtration media 10.

A layer 12 may be bonded to the peaks 28 of some or all of the structured surface 13 of an adjacent layer to enhance the creation of discrete pathways from the channels 25. This can be done using conventional adhesives that are compatible with the materials of the layers 12, or this can be done using heat bonding, ultrasonic bonding, mechanical devices, or the like. Bonds may be provided entirely along the peaks 28 to the adjacent surface 11, or may be spot bonds provided in accordance with an ordered pattern, or randomly. Alternatively, the layers 12 may simply be stacked upon one another whereby the structural integrity of the stack adequately enhances the creation of discrete flow channels 25.

Figure 1:
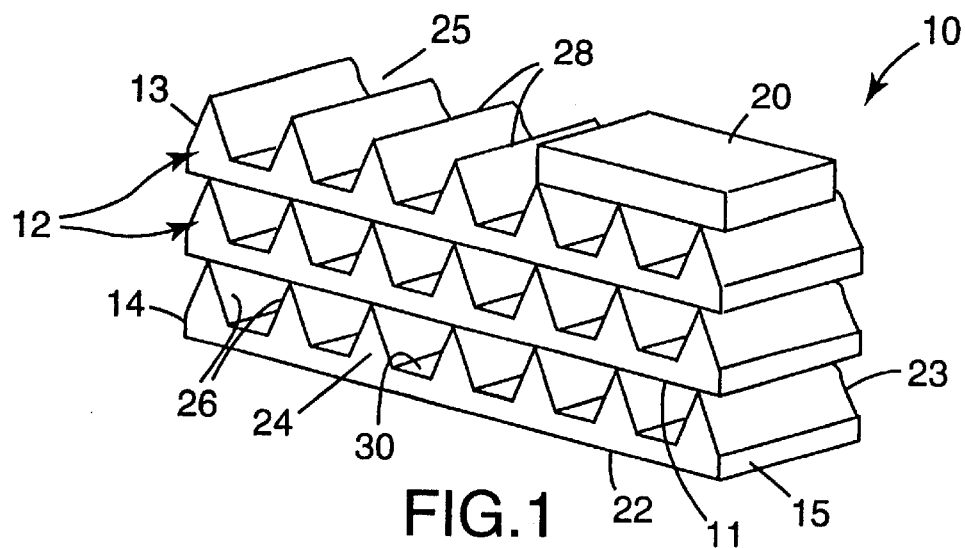
FIG. 1 is a perspective view of a stack of layers having structured surfaces forming a filtration media in accordance with the present invention.

To close off some, but preferably all of the channels 25 of the uppermost layer 12, a cap layer 20 may also be provided, as shown in FIG. 1. This cap layer 20 may be bonded or unbonded in the same or a different manner as the inter-layer bonding described above. The material for cap layer 20 can be the same or different from the material of the layers 12.

The embodiments of the filtration media 10 shown in FIGS. 1, 3 and 4 comprise ordered linear channels. These channels may be aligned in a precise array, that is the channels of each layer line up with the channels of the other layers, thereby presenting a regular, aligned pore pattern. Alternatively, these channels may be offset in a regular, repeating manner, or they may be offset in a controlled manner. In addition, other channel and layer configurations are contemplated.

FIGS. 3 and 4 illustrate an embodiment in accordance with the present invention where numerous layers 12 of filtration media 80 having structured surfaces 13 are stacked in a controlled and ordered manner but not necessarily in an aligned manner. The resulting stack of layers 12 has been sliced, forming a volume of controlled depth. FIG. 4 depicts an enlargement of a portion of the filtration media 80 of FIG. 3. Each structured surface 13 comprises consistent channels 25 defined by peaks 28 separated by a floor 30. The floor 30 comprises secondary channels 34. (This type of channel configuration will be discussed more below in relation to FIG. 9.) The resulting filtration media 80 provides a highly ordered, porous surface through which a fluid to be filtered would flow. Each available channel 25 then provides a fluid pathway through the controlled depth of the filtration media 80.

Figure 5:
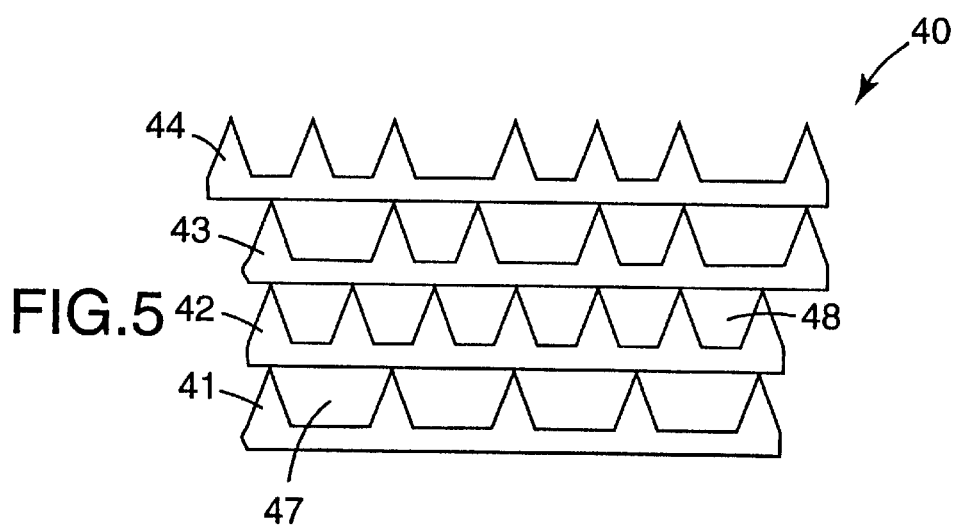
FIG. 5 is an end view of stacked layers having structured surfaces illustrating an alternative layer configuration that may be used for filtration media in accordance with the present invention.
Figure 6:
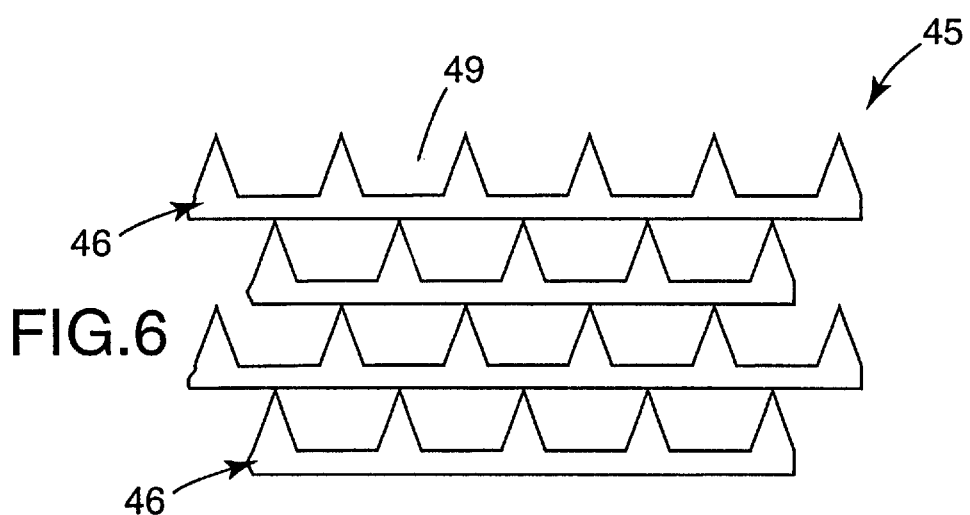
FIG. 6 is an end view of stacked layers having structured surfaces illustrating another alternative layer configuration that may be used for filtration media in accordance with the present invention.

FIG. 5 illustrates an embodiment where each layer 41 to 44 of filtration media 40 has a different channel configuration, and the layers 41 to 44 are arranged in varying repeat patterns with respect to each other. As can be seen, layer 41 comprises consistent wide channels 47, layer 42 comprises narrower consistent channels 48, layer 43 comprises a repeating pattern of wide 47 then narrow 48 channels, and layer 44 comprises a repeating pattern of two narrow 48, then one wide 47 channels. Channel repeat patterns could also be random, or the selection of layers comprising the stack could be done in a pattern or in a random fashion. In any case, these configurations would still create ordered pathways because the opening sizes and channel structures formed would be as expected. FIG. 6 illustrates an embodiment of a filtration media 45 wherein the channels 49 of each layer 46 are consistent, but the relationship of the layers 46 to each other is an alternating pattern. The choice of channel configurations, number of channels, and or layer relationships depends on the particular application for which the filtration media is desired.

Figure 11:
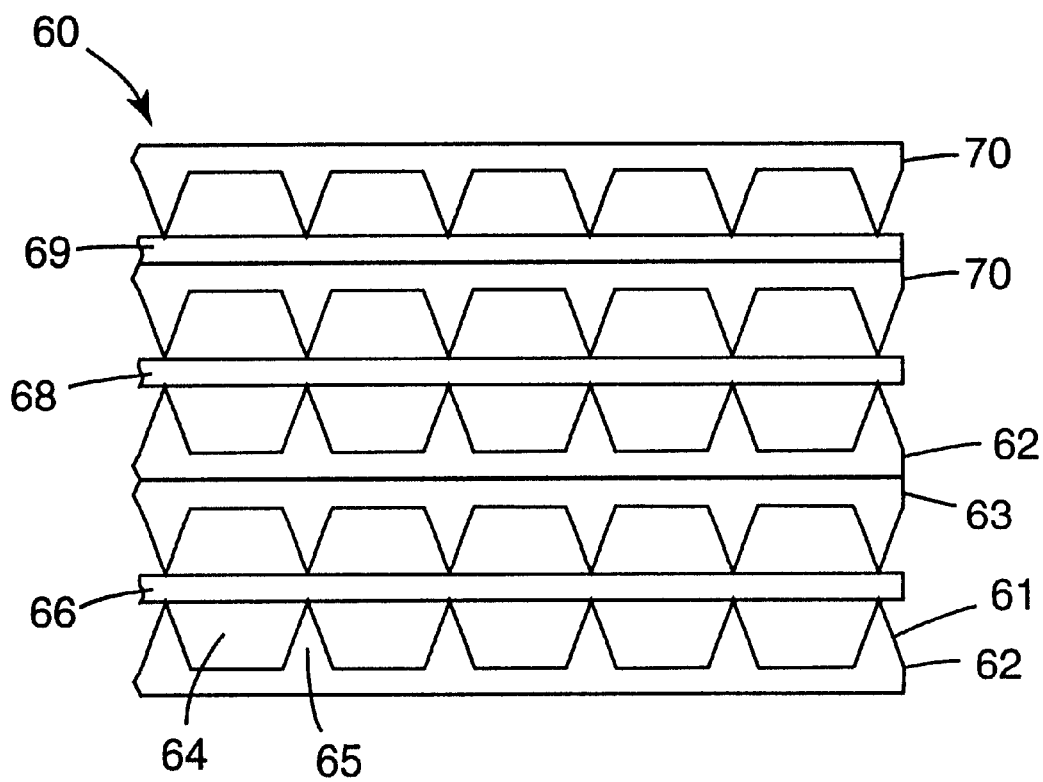
FIG. 11 is an end view of a stack of layers having structured surfaces with additional layers interposed between facing and non-facing layers.

FIG. 11 illustrates an embodiment wherein filtration media 60 comprises similar layers 62, 63 and 70 having channels 64 defined by peaks 65 within structured surface 61. However, the layers 62, 63 and 70 differ in their orientation and repeat pattern with respect to each other. Layer 62 is an upward facing layer, whereas layers 63 and 70 are downward facing layers. These layers 62, 63 and 70 are all arranged in a varying stack configuration, including additional layers 66, 68 and 69. As illustrated, layers may be arranged to face one another, may be back-to-back, or may be stacked in the same orientation. In addition, the repeat pattern with respect to one another can provide for aligned channels or offset channels, in numerous variations. As is evident from FIGS. 5, 6 and 11, the channel and layer configurations available with the present invention provide versatility and adaptability to meet any filtration requirement.

Although the embodiment of FIG. 1 is shown with structured surfaces 13 comprising multiple peaks 28 and wide floors 30, continuously provided from one side edge 14 to the other side edge 15, other channel configurations are contemplated. In most cases, it will be desirable to provide a series of peaks 28 entirely from one edge 14 of the layer 12 to the other edge 15; however, for some applications, it may be desirable to extend the peaks 28 only along a portion of the structured surface 13 on any given layer 12. In addition, a specific application for the filtration media 10 may determine the number, type and size of the channels 25 provided to meet the filtration requirements.

Figure 7:
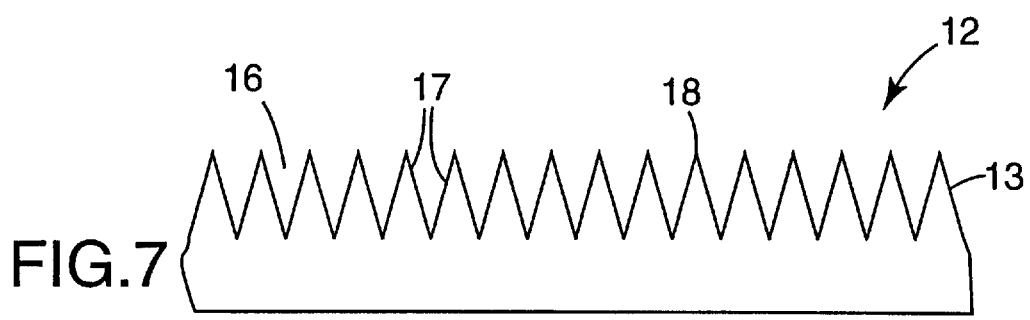
FIG. 7 is an end view of a layer having a structured surface illustrating one particular channel configuration that may be used for filtration media in accordance with the present invention.
Figure 8:
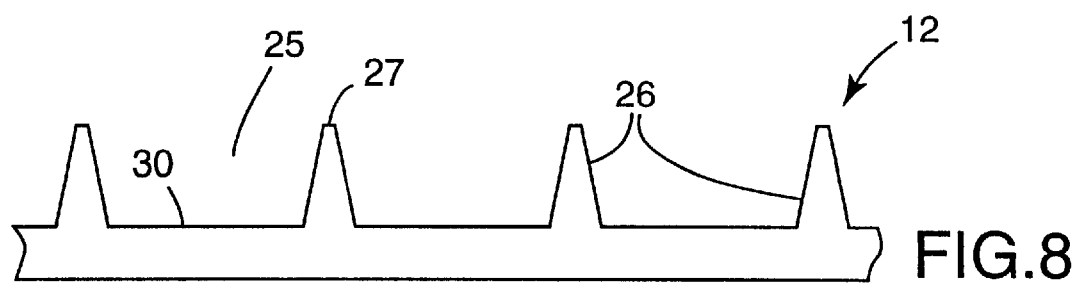
FIG. 8 is an end view of a layer having a structured surface illustrating another channel configuration that may be used for filtration media in accordance with the present invention.
Figure 9:
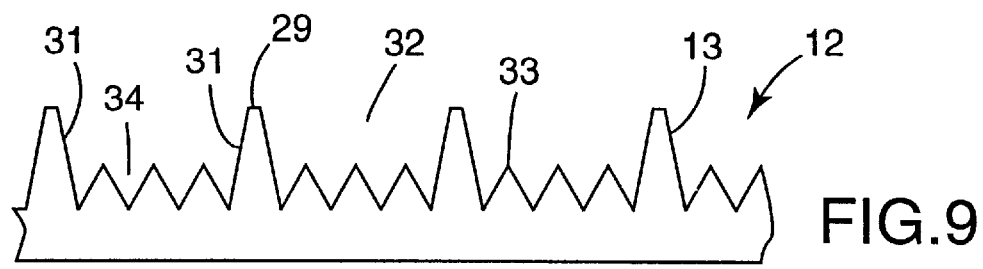
FIG. 9 is an end view of a layer having a structured surface illustrating yet another channel configuration that may be used for filtration media in accordance with the present invention.

For example, as shown in FIG. 7, channels 16 are defined by a continuous series of peaks 18 which are not separated by a floor. Therefore, the sidewalls 17 of each successive peak 18 converge to define a line at the base of the channel 16. A filtration media 10' formed from stacks of layers 12 having this type of channel 16 is shown in FIG. 2. In FIG. 8, the channels 25 are defined by a continuous series of peaks 27 that are separated by a wide, flat floor 30. Each peak 27 is flattened at the top, thereby facilitating bonding to an adjacent layer. In FIG. 9 (as well as in FIGS. 3 and 4), wide channels 32 are defined between peaks 29, but instead of providing a planar floor between channel sidewalls 31, a plurality of smaller sub-peaks 33 are provided. These sub-peaks 33 thus define secondary channels 34 therebetween. Subpeaks 33 may or may not rise to the same level as peaks 29, and as illustrated, create a first wide channel 32 including smaller channels 34 distributed therein. The peaks 29 and sub-peaks 33 need not be evenly distributed with respect to themselves or each other. This configuration has the added advantage of increasing the amount of channel surface area upon which particulate matter may impinge during filtration. Moreover, the smaller channels 34 can be used to control fluid flow through the wider channels 32.

Although FIGS. 1–11 illustrate elongated, linearly-configured channels, the channels may be provided in many other configurations. For example, the channels could have varying cross-sectional widths along the channel length; that is, the channels could diverge and/or converge along the length of the channel. The channel sidewalls could also be contoured rather than being straight in the direction of extension of the channel, or in the channel height. Generally, any channel configuration that can provide at least multiple discrete channel portions that extend from a first point to a second point within the filtration media are contemplated.

The structured surface filtration media may be particularly useful where it is desirable to circulate a particular fluid through the media to influence a characteristic of the fluid by its contact with the structured surface(s). That is, the fluid may be treated by its passing through the channels defined by the surfaces(s). Fluid treatment might include chemical, catalytic, and ionization reactions promoted by constituents placed on, in, or through the channel surfaces. Ionization reactions may include reactions promoted by e-beam, actinic light, and ultraviolet radiation. Separation treatments such as by sorption of fluid constituents onto properly prepared channel surfaces would be effective due to the high ratio of channel surface area to channel volume. The same attributes could be used to permit the sensing or detecting of a passing fluid where the surface layer(s) act as the fluid interface component in a sensor or detector system. A fluid detection system might monitor fluid conductivity, pH, temperature, or composition. Alternately, a fluid influenced by the surrounding environment as it circulates through the channels could be monitored as part of a detection system where the device would itself function as an element in a sensor or detection system. The surface of the flow channels could also be functionalized to respond or detect these physical conditions. Heating or cooling could be used to thermally treat the fluid. Fluid streams of different composition also could be made to merge together to interact and treat one another as a means to cause a reaction, dilution, or blending. An observation, detection, or analytical device such as a microscope or spectrometer, remote to the media may be used to analyze fluid as it passes in a thin film through the channels. In any case, as with any of the noted embodiments, the structure can be made from flexible, semi-rigid, or rigid materials.

Figure 10:
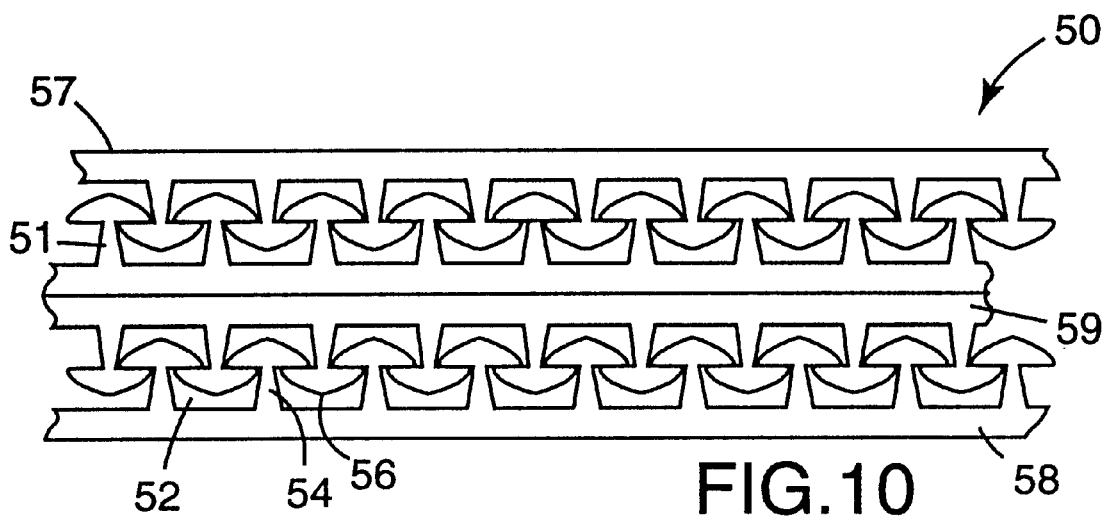
FIG. 10 is an end view of a stack of layers having structured surfaces wherein facing layers engage by means of headed channels.

In another embodiment of filtration media 50, as shown in FIG. 10, the structured surface 51 comprises channels 52 that are defined by a series of peaks 54 having heads 56 which overhang adjacent channels 52. Although these peaks 54 and heads 56 are shown as a mushroom-like feature, any headed configuration is contemplated. The facing layers 58 and 59 comprising such channels 52 are stacked together by offsetting the channels 52 of the layers 58 and 59, and engaging the peaks 54 and heads 56 of one layer 58 with the peaks 54 and heads 56 of the other layer 59. Thus, the peak 54 and head 56 of one layer 58 is located within a channel 52 of the other layer 59. A plurality of these engaged layers 58 and 59 are then stacked together to form the filtration media 50. Alternatively, the layers 58 and 59 may be non-facing layers stacked together such that the non-structured surface 57 serves as a cap for an adjacent layer. (Not shown). As with the other embodiments discussed above, the layers may or may not be bonded together as a stack. The resulting channel structure of this embodiment has the advantage of increasing the channel surface area in contact with the fluid being filtered, thus improving particulate removal.

Figure 12:
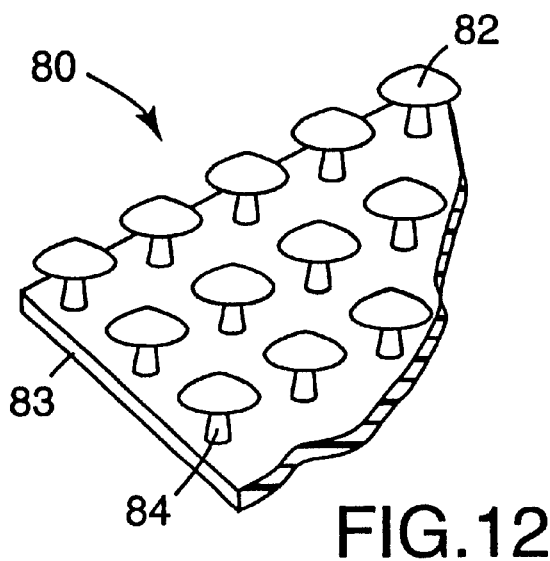
FIG. 12 is a perspective view of a portion of a layer having a structured surface that has discrete, headed protuberances formed in an ordered array.

Alternatively, the filtration media 50 may be formed from stacked layers 80 wherein the structured surfaces 82 comprise ordered arrays of discrete, headed protuberances 84, as shown in FIG. 12, instead of headed channels. These protuberances 84 also may be formed as mushroom-like structures, but other headed structures are contemplated. The protuberances 84 may be formed in an aligned array on the structured surface 82, or they may be formed in an offset array or other ordered pattern. Layers 80 comprising these protuberances 84 may be stacked together by facing the layers 80, and engaging the protuberances 84 of one layer 80 among the protuberances 84 of the other layer 80, similar to layers 58 and 59 of FIG. 10. The protuberances of one layer need not be the same as the protuberances of an adjacent layer. Alternatively, the layers 80 may be non-facing layers stacked together such that the non-structured surface 83 serves as a cap for an adjacent layer. Whether the layers 58, 59 and 80 are formed from headed channels or discrete protuberances, ordered fluid pathways through the filtration media 50 are provided. These types of layers provide the added advantage of increasing the percentage of openings per volume without decreasing the surface area, i.e., decreasing percent solidity with respect to face surface area, thereby improving filtration efficacy without increasing flow resistance.

In some embodiments of the present invention, the structured surfaces 13 of filtration media 10 are microstructured surfaces that define discrete flow channels, including those contemplated above. As used here, aspect ratio means the ratio of a channel's length to its hydraulic radius, and hydraulic radius is the wettable cross-sectional area of a channel divided by its wettable channel circumference. When an embodiment of the present invention comprises discrete flow channels, each channel may have a minimum aspect ratio (length/hydraulic radius) of 10:1, in some embodiments exceeding approximately 100:1, and in other embodiments at least about 1000:1. At the top end, the aspect ratio could be indefinitely high but generally would be less than about 1,000,000:1. Likewise with such embodiments, a hydraulic radius of a channel is preferably no greater than about 300 $\mu$m. In many embodiments, it can be less than 100 $\mu$m, and may be less than 10 $\mu$m. Although smaller is generally better for many applications (and the hydraulic radius could be submicron in size), the hydraulic radius typically would not be less than 1 $\mu$m for most embodiments. These ratios are exemplary, and are not intended to be limiting.

The structured surface 13 of each layer 12 can also be provided with a very low profile. Thus, filtration media layers are contemplated where the structured polymeric layer has a thickness of less than 5000 micrometers, and even possibly less than 1500 micrometers. To do this, the channels may be defined by peaks that have a height of approximately 5 to 1200 micrometers and that have a peak distance of about 10 to 2000 micrometers. It is understood, however, that the specific peak heights and peak distances are not as important as an overall percent solidity to surface area relationship in the resulting filtration media. It might be advantageous in certain applications where flow resistance is critical to increase the pore size, such as by increasing the channel cross-section, thereby reducing the percentage particle capture but increasing the fluid flow through the filter. In other applications, it might be more advantageous to decrease pore size and increase pore quantity to particularly take advantage of particle exclusion and expanded surface area, as opposed to particle capture mechanisms. The present invention has the distinct advantage of providing the ability to customize the filtration media in a very controlled and predictable manner, thereby allowing production of these types of application specific filtration media.

Microstructured surfaces useful in some embodiments of the present invention provide flow systems in which the volume of the system is highly distributed. That is, the fluid volume that passes through such flow systems is distributed over a large area. This feature is highly beneficial for many filtering applications. Such microstructured surfaces can be made by known techniques including microreplication, which as used in this application means the production of a microstructured surface through a process where the structured surface features retain an individual feature fidelity during manufacture, from product-to-product, that varies no more than about 50 $\mu$m. The microreplicated surfaces preferably are produced such that the structured surface features retain an individual feature fidelity during manufacture, from product-to-product which varies no more than 25 $\mu$m.

Referring back to FIGS. 1, 3 and 4, at least some, if not all of the channels 25 are open on the face side 22 of the filtration media 10, forming pores in the face surface 24. Fluid passes into the filtration media 10 at the face surface 24, preferably traveling through the channels 25 and exiting at the back side 23 of the filtration media 10. At a minimum, the structured surfaces of the present invention provide controlled and ordered fluid pathways through the filtration media. The amount of surface area available for filtration purposes is therefore determined by the volume of the filtration media. In other words, the structured surface features of the filtration media layers, such as the length of the channels and the channel configurations, define the useable surface area, and not just the face surface.

A single layer provided with a structured surface may also comprise a functional filter media in accordance with the present invention. Specifically, its structured surface may function to remove particles from a fluid stream by any and all of the removal mechanisms discussed below provided that the flow of fluid to be treated (filtered) is caused to stream through pathways defined by the surface structure. The particle removal mechanisms may be enhanced by any of the treatments discussed below as well. For example, a single layer having any of the structured surfaces disclosed and contemplated in this application could be provided as a surface layer of any conduit so long as the fluid to run within the conduit is directed to run at least somewhat within the structured surface.

The mechanisms for particle removal available in fibrous filters are also available the filtration media of the present invention but without the inherent limitations of fibrous filter media. Direct interception is dependent on pore size, and pore size, in turn, is dependent on structured surface features, such as channel cross-section and configuration. Under the present invention, structured surface features such as channels can be produced in widely varying sizes and configurations in a consistent, controlled and predictable manner unavailable in fibrous, and especially nonwoven, filters. A filtration media of stacked structured layers provides a highly ordered and mechanically stable porous surface without the pore size variability and gross irregularities of nonwoven webs. Any pore size variability or irregularities are planned and controlled based on the ultimate filtration needs for which the filtration media of the present invention is intended. As a result, the fluid stream is subjected to uniform treatment as it passes through the face surface of the filtration media, thus enhancing its filtering efficiency.

Inertial impaction and diffusional interception also occur in the filtration media of the present invention. Both of these removal mechanisms are dependent on the available surface area within the filtration media. In fibrous filters, the surface area of the individual fibers provides this surface area. In the present invention, (whether a single layer or a stack of layers) this surface area is provided by the surface area of the structured surface features including channels whose surface area is defined by channel configuration and length. As the fluid stream passes through a stacked layer filtration media via ordered fluid pathways, particles smaller than the face surface pore size will impact on the sidewalls, floors, caps and other features of the structured surfaces due to their density or Brownian motion, as described above for the fibrous filters. Use of structured surfaces comprising channels with various channel configurations may enhance this ability. Restricting the fluid flow to discrete channels using bonded layers may further enhance this ability, or it may be further enhanced by not restricting channel-to-channel fluid flow. Fluid flow would then be allowed between channels to a limited extent, thus increasing the surface area which comes in contact with or adjacent to the fluid stream.

Unlike the fibrous filters, however, the filtration media of the present invention does not serve as a surface loading filter that is subject to surface blinding, but instead serves as a depth-bed filter using the entire filtration media volume to improve its filtering efficiency and capacity, yet still functions at a low flow resistance. This feature is due to the low percent solidity achievable with the present invention, as well as a lower likelihood of through-channel blockage, and the consistency of the pores and channels over the whole face surface area resulting from the controlled and predictable formation process. This ability to serve as a depth-bed filter can be further improved by the choice of structured surfaces including channel configuration, such as those shown in FIGS. 4, 9, and 10, where the available surface area within each channel is increased by additional sub-channels or other structural additions. Therefore, the capacity and efficiency of the filtration media of the present invention is greatly improved over that of a fibrous filter having the same face surface area in both low and high face velocity applications.

Additional advantages of the inventive filtration media include the ability to be manufactured in wide ranges of pore sizes and depths with accuracy and reliability. It can be produced with the feature sizes, bulk density and the materials base currently applied to nonwoven and fibrous filters, but it has the added advantages described above. While traditional fibrous filter media can be pleated or used flat, the filtration media of the present invention may be may be formed into a multitude of self-supporting configurations. It may be conformed into shapes, laid over objects, have force applied without crushing and closing the channels. In addition, the filtration media's ability to be employed in three-dimensional form, rather than the planar form of fibrous filters, offers an array of new end-product configurations, especially due to its ability to serve as a rigid structural element in a design. Filtration media of the present invention also has the added advantage of not being susceptible to breakage caused by manipulation of the filtration media by, for example, pleating, handling, or assembly. Fiber breakage in traditional fibrous filters can cause a number of problems, especially in clean room application. Another advantage is the ability to form the structured surfaces of the layers so as to direct the flow path in a desired manner.

Figure 13:
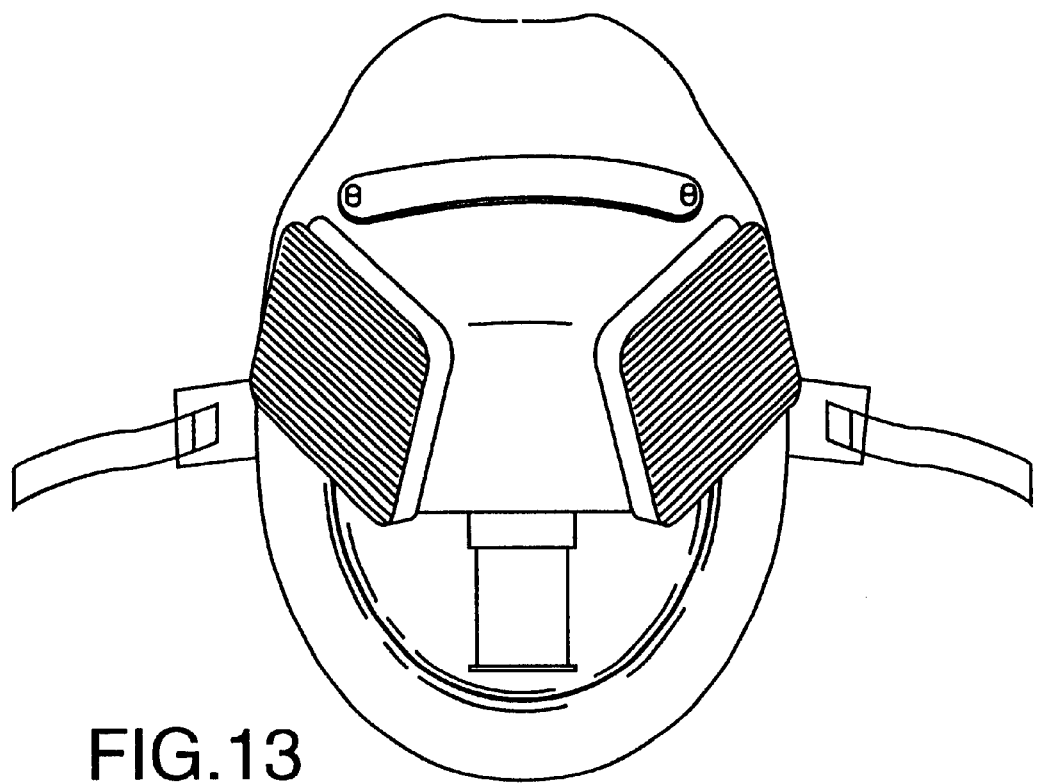
FIG. 13 is a front view of a respirator mask using filtration media in accordance with the present invention.

An example of the filtration media being used in an end product is shown in FIG. 13. A respirator mask having dual filters is shown with the filtration media of the present invention being used as the filters. Use of the filtration media in this type of application reduces the bulk and weight of the mask by eliminating the need for filter canisters that commonly are needed to obtain the necessary filter capacity of the mask.

In order to enhance filtering capabilities or to effect a desired result, the inventive filtration media may be treated in numerous ways. One treatment example is shown in FIG. 11. Filtration media 60 comprises a stack of layers 62, 63 and 70. Interposed between facing layers 62 and 63 is an additional layer 66 serving as a cap layer for at least some of the channels 64 of each layer 62 and 63. More than one type of additional layer may be provided between subsequent groupings of facing layers, as shown by additional layers 66 and 68. In addition, the same or different additional layers 69 may be provided between non-facing layers 70 to improve particle removal or provide other benefits. Any type, size, configuration and relationship of structured surface features are contemplated for use with additional layers 66, 68 or 69. These additional layers 66, 68 and 69 may be formed of the same or similar material as the other structured layers 62, 63 or 70, or they may comprise other materials that may provide enhanced particle removal or other desired benefits, and are effective for the purpose contemplated.

Materials that enhance particle removal or achieve other desired benefits may include, either alone or fixed to a substrate: adsorbents, such as activated carbon, zeolite or aluminosilicate for removing organic molecules or deodorization; deodorizing catalysts such as copper-ascorbic acid for decomposition of malodorous substances; drying agents such as silica gel, zeolite, calcium chloride, or active aluminal; a disinfecting agent such as a UV germicidal system; fragrances such as gloxal, methacrylic acid esters or perfumes; or ozone removing agents including metals such as Mg, Ag, Fe, Co, Ni, Pt, Pd, or Rn, or an oxide supported on a carrier such as alumina, silica-alumina, zirconia, diatomaceous earth, silica-zirconium, or titania. Any of the listed materials, and others which are not listed but would be suitable to meet a desired purpose and be effective with the present invention, may be used in any combination Another type of treatment available to filtration media of the present invention is either passive or active electrostatic charging of the filtration material. Electrostatic charging enhances the filtration media's ability to remove particulate matter from a fluid stream by increasing the attraction between particles smaller than the pore size and the surface area of the structured surfaces, thus enhancing the third mechanism for particle removal. Non-impinging particles passing close to sidewalls are more readily pulled from the fluid stream, and impinging particles are adhered more strongly. Electrostatic charging may be provided by an electret, which is a piece of dielectric material that exhibits an electrical charge that persists for extended time periods. Electret chargeable materials include nonpolar polymers such as polytetrafluoroethylene (PTFE) and polypropylene. Generally, the net charge on an electret is zero or close to zero and its fields are due to charge separation and not caused by a net charge. Through the proper selection of materials and treatments, an electret can be configured that produces an external electrostatic field. Such an electret can be considered an electrostatic analog of a permanent magnet.

Several methods are used to charge dielectric materials, any of which may be used to charge the filtration media of the present invention, including corona discharge, heating and cooling the material in the presence of a charged field, contact electrification, spraying the web with charged particles, and impinging a surface with water jets or water droplet streams. In addition, the chargeability of the surface may be enhanced by the use of blended materials. Examples of charging methods are disclosed in the following patents: U.S. Pat. No. RE 30,782 to van Turnhout et al., U.S. Pat. No. RE 31,285 to van Turnhout et al., U.S. Pat. No. 5,496,507 to Angadjivand et al., U.S. Pat. No. 5,472,481 to Jones et al., U.S. Pat. No. 4,215,682 to Kubik et al., U.S. Pat. No. 5,057,710 to Nishiura et al., U.S. Pat. No. 4,592,815 to Nakao, and U.S. Pat. No. 4,798,850 to Brown.

Types of active charging include the use of a film with a metallized surface on one face that has a high voltage applied to it. This could be accomplished in the present invention by the addition of such metallized layer adjacent a structured layer, or the application of a metal coating on the nonstructured surface of a structured layer. Filtration media comprising such metallized layers could then be mounted in contact with an electrical voltage source resulting in electrical flow through the metallized media layers. Examples of such active charging are disclosed in U.S. Pat. No. 5,405,434 to Inculet.

Another type of treatment available to the filtration media of the present invention is the use of fluorochemical additives in the form of material additions or material coatings can improve the filter's ability to repel oil and water, as well as enhance the filter's ability to filter oily aerosols. Examples of such additives are found in U.S. Pat. No. 5,472,481 to Jones et al., U.S. Pat. No. 5,099,026 to Crater et al., and U.S. Pat. No. 5,025,052 to Crater et al.

In addition, the filtration media may be embedded, coated, or otherwise treated with a tacky substance designed to attract and adhere impinging particles. The filtration media may also be embedded, coated or otherwise treated with a chemical reactant, or other compound, designed to react in some manner with the fluid stream either to enhance filtration, or to produce an additional result. These types of compounds and results are similar to those listed above for treatment by added layers. These compounds may include adsorbents, such as activated carbon, zeolite or aluminosilicate for removing organic molecules or deodorization; deodorizing catalysts such as copper-ascorbic acid for decomposition of malodorous substances; drying agents such as silica gel, zeolite, calcium chloride, or active aluminal; a disinfecting agent such as a UV germicidal system; fragrances such as gloxal, methacrylic acid esters or perfumes; or ozone removing agents including metals such as Mg, Ag, Fe, Co, Ni, Pt, Pd, or Rn, or an oxide supported on a carrier such as alumina, silica-alumina, zirconia, diatomaceous earth, silica-zirconium, or titania.

The making of structured surfaces, and in particular microstructured surfaces, on a polymeric layer such as a polymeric film are disclosed in U.S. Pat. Nos. 5,069,403 and 5,133,516, both to Marentic et al.

Structured layers may also be continuously microreplicated using the principles or steps described in U.S. Pat. No. 5,691,846 to Benson, Jr. et al. Other patents that describe microstructured surfaces include U.S. Pat. No. 5,514,120 to Johnston et al., U.S. Pat. No. 5,158,557 to Noreen et al., U.S. Pat. No. 5,175,030 to Lu et al., and U.S. Pat. No. 4,668,558 to Barber.

Structured polymeric layers produced in accordance with such techniques can be microreplicated. The provision of microreplicated structured layers is beneficial because the surfaces can be mass produced without substantial variation from product-to-product and without using relatively complicated processing techniques. "Microreplication" or "microreplicated" means the production of a microstructured surface through a process where the structured surface features retain an individual feature fidelity during manufacture, from product-to-product, that varies no more than about 50 $\mu$m. The microreplicated surfaces preferably are produced such that the structured surface features retain an individual feature fidelity during manufacture, from product-to-product, which varies no more than 25 $\mu$m.

Filtration media layers for any of the embodiments of the present invention can be formed from a variety of polymers or copolymers including thermoplastic, thermoset, and curable polymers. As used here, thermoplastic, as differentiated from thermoset, refers to a polymer which softens and melts when exposed to heat and re-solidifies when cooled and can be melted and solidified through many cycles. A thermoset polymer, on the other hand, irreversibly solidifies when heated and cooled. A cured polymer system, in which polymer chains are interconnected or crosslinked, can be formed at room temperature through use of chemical agents or ionizing irradiation.

Polymers useful in forming any of the structured layers or articles of the invention include but are not limited to polyolefins such as polyethylene and polyethylene copolymers, polyvinylidene diflouride (PVDF), and polytetrafluoroethylene (PTFE). Other polymeric materials include acetates, cellulose ethers, polyvinyl alcohols, polysaccharides, polyolefins, polyesters, polyamids, poly (vinyl chloride), polyurethanes, polyureas, polycarbonates, and polystyrene. Structured layers can be cast from curable resin materials such as acrylates or epoxies and cured through free radical pathways promoted chemically, by exposure to heat, UV, or electron beam radiation.

There are applications where flexible filter media is desired. Flexibility may be imparted to a structured polymeric layer using polymers described in U.S. Pat. No. 5,450,235 to Smith et al. and U.S. Pat. No. 5,691,846 to Benson, Jr. et al. The whole polymeric layer need not be made from a flexible polymeric material. A portion of a layer, for example, could comprise a flexible polymer, whereas the structured portion or portion thereof could comprise a more rigid polymer. The patents cited in this paragraph describe use of polymers in this fashion to produce flexible products that have microstructured surfaces.

Polymeric materials including polymer blends can be modified through melt blending of plasticizing active agents such as surfactants or antimicrobial agents. Surface modification of the structured surfaces can be accomplished through vapor deposition or covalent grafting of functional moieties using ionizing radiation. Methods and techniques for graft-polymerization of monomers onto polypropylene, for example, by ionizing radiation are disclosed in U.S. Pat. Nos. 4,950,549 and 5,078,925. The polymers may also contain additives that impart various properties into the polymeric structured layer. For example, plasticisers can be added to decrease elastic modulus to improve flexibility.

The filtration media of the present invention starts with the desired materials from which the layers are to be formed. Suitable sheets of these materials having the required thickness or thicknesses are formed with the desired surface topography by such methods as microreplication (i.e. by casting a film onto a patterned roll or belt). A single layer with a structured surface can function as a filter provided the flow of gas to be treated is caused to stream through the fluid pathways defined by the surface structure. Single or multiple layers can additionally be employed as filters when covered or stacked. Stacked layers are oriented in a predetermined pattern or relationship, with or without additional layers, to build up a suitable volume of layers. These layers may be bonded together, as described above, or may be depended upon to retain their relationship without bonding. The resulting volume of layers is then converted, by slicing or otherwise, into filtration media of a desired thickness. This filtration media may then be mounted, or otherwise assembled into a final useable format. Any desired treatments, as described above, may be applied at any appropriate stage of the manufacturing process. In addition, filtration media in accordance with the present invention may be combined with other filtering material, such as a layer of nonwoven fibrous material over the face surface, or may be combined with other non-filtering material to facilitate such things as handling, mounting, assembly or use.

Preferred embodiments of the invention may use thin flexible polymer films that have parallel linear topographies as the microstructure-bearing element. For purposes of this invention, a "film" is considered to be a thin (less than 5 mm thick) generally flexible sheet of polymeric material. The economic value in using inexpensive films with highly defined microstructure-bearing film surfaces is great. Flexible films can be used in combination with a wide range of other materials and can be used unsupported or in conjunction with a supporting body where desired. The filter media formed from such microstructured surfaces and other layers, if provided, may be flexible for many applications but also may be associated with a rigid structural body where applications warrant.

In those embodiments where the structured layer or layers of a filter media of the invention include microstructured channels, such devices may employ a multitude of channels per device. As shown in some of the embodiments illustrated above, such microstructured layers can easily possess more than 10 or 100 channels per layer. Some applications may have more than 1,000 or 10,000 channels per layer.

All of the patents and patent applications cited above are wholly incorporated by reference into this document. Also, this application also wholly incorporates by reference the following patent applications that are commonly owned by the assignee of the subject application and filed on even date herewith: U.S. patent application Ser. No. 09/099,269 to Insley et al. and entitled "Microchanneled Active Fluid Transport Devices"; U.S. patent application Ser. No. 09/099,632 to Insley et al. and entitled "Microchanneled Active Fluid Heat Exchanger"; U.S. patent application Ser. No. 09/100,163 to Insley et al. and entitled "Microstructured Separation Device"; and U.S. patent application Ser. No. 09/099,565 to Insley et al. and entitled "Fluid Guide Device Having an Open Microstructured Surface for Attachment to a Fluid Transport Device."

Although the present invention has been described with reference to preferred embodiments, workers skilled in the art will recognize that changes may be made in form and detail without departing from the spirit and scope of the invention.

What is claimed is:

1. A method of filtering certain particles from a fluid comprising:
    providing a depth loading filtration media, the depth loading filtration media comprising a plurality of substantially flat and mutually coplanar polymeric structured flexible film layers, the structured film layers formed of a thermoplastic polymer and having a structured surface defined on each film layer, the plurality of structured film layers configured as a stack in a substantially coplanar manner such that the structured surfaces of the film layers define a plurality of ordered inlets open through a face of the stack and corresponding ordered fluid pathways having at least one discrete flow channel from one of the inlets to an outlet open through another face of the stack at least one surface of the flexible film layers being provided with a treatment to enhance particle removal, forming filtration surfaces, such that the depth loading filtration media is formed as an ordered, porous volume;
    positioning the depth loading filtration media in a fluid flow path;
    passing fluid containing particles through the depth loading filtration media; and
    removing particles to be filtered from the fluid by at least the filtration surfaces provided within the depth of the depth loading filtration media along the ordered fluid pathways.

2. The method of claim 1, wherein providing a filtration media further comprises treating at least a portion of the surfaces of the plurality of structured film layers to provide at least one of the benefits of enhanced particle removal, oil and water repellency, odor removal, organic matter removal, ozone removal, disinfection, drying, and fragrance introduction.

3. The method of claim 1, wherein the filtration surfaces of the plurality of structured film layers is provided with an electret charge.

4. The method of claim 1, wherein the filtration surfaces of the plurality of structured film layers are actively charged by metallized layers provided as the filtration surfaces by connecting the metallized layers to a voltage source during filtering.

5. The method of claim 2, wherein treating comprises surface coating at least a portion of the surfaces of the plurality of structured film layers.

6. The method of claim 2, wherein treating comprises adding at least one additional layer between adjacent structured film layers for the purpose of providing the benefits.

7. The method of claim 1, wherein providing the depth loading filtration media further comprises directing fluid flow to a specific destination by configuring the ordered fluid pathways within the depth loading filtration media.

8. A method of making and using a depth loading filtration media comprising:
    providing a plurality of structured flexible film layers comprised of a thermoplastic polymer and having a structured surface defined on each film layer at least one surface of the flexible film layers being provided with a treatment to enhance particle removal, forming filtration surfaces;
    stacking the plurality of structured film layers in a substantially mutually coplanar manner such that the structured surface of the film layers define a plurality of ordered inlets open through a face of the stack and corresponding ordered fluid pathways having at least one discrete flow channel from one of the inlets to an outlet open through another face of the stack, thereby forming an ordered, porous volume with filtration surfaces;
    positioning the ordered, porous volume in a fluid flow path including a fluid with particles to be removed;
    passing fluid through the ordered, porous volume; and
    removing particles from the fluid to be filtered by filtration surfaces provided within the depth of the ordered, porous volume along the ordered fluid pathways.

9. The method of claim 8, further comprising bonding at least a portion of the plurality of structured film layers within the ordered, porous volume.

10. The method of claim 8, further comprising slicing the stack of structured film layers and providing at least a portion of the sliced stack to form an ordered, porous volume of a specified thickness.

11. The method of claim 8, further comprising treating at least a portion of the surfaces of the plurality of structured film layers to provide at least one of the benefits of enhanced particle removal, oil and water repellency, odor removal, organic matter removal, ozone removal, disinfection, drying, and fragrance introduction.

12. The method of claim 8, wherein the filtration surfaces of the plurality of structured film layers is provided with an electret charge.

13. The method of claim 8, wherein the filtration surfaces of the plurality of structured film layers are actively charged by metallized layers provided as the filtration surfaces by connecting the metallized layers to a voltage source during use of the filtration media.

14. The method of claim 11, wherein treating comprises surface coating at least a portion of the surfaces of the plurality of structured film layers.

15. The method of claim 11, wherein treating comprises adding at least one additional layer between adjacent structured film layers for the purpose of providing the benefits.

16. The method of claim 8 further comprising directing fluid flow to a specific destination by configuring the ordered fluid pathways within the ordered, porous volume.

17. The method of claim 1, wherein the structured film layers of the depth loading filtration media are flexible.

18. The method of claim 1, wherein fluid is passed through the depth loading filtration media while at least a pair of adjacent structured film layers are unbonded to one another.

19. The method of claim 1, wherein the ordered fluid pathways are defined by a plurality of flow channels, each flow channel extending from a first point to a second point along the structured surfaces of the structured film layers, each flow channel also having a minimum aspect ratio of about 10:1 and a hydraulic radius no greater than about 300 micrometers.

* * * * *